F. KENNEDY.
MEANS TO PREVENT MISUSE OF GAS METERS.
APPLICATION FILED JULY 17, 1908.
932,140.
Patented Aug. 24, 1909.
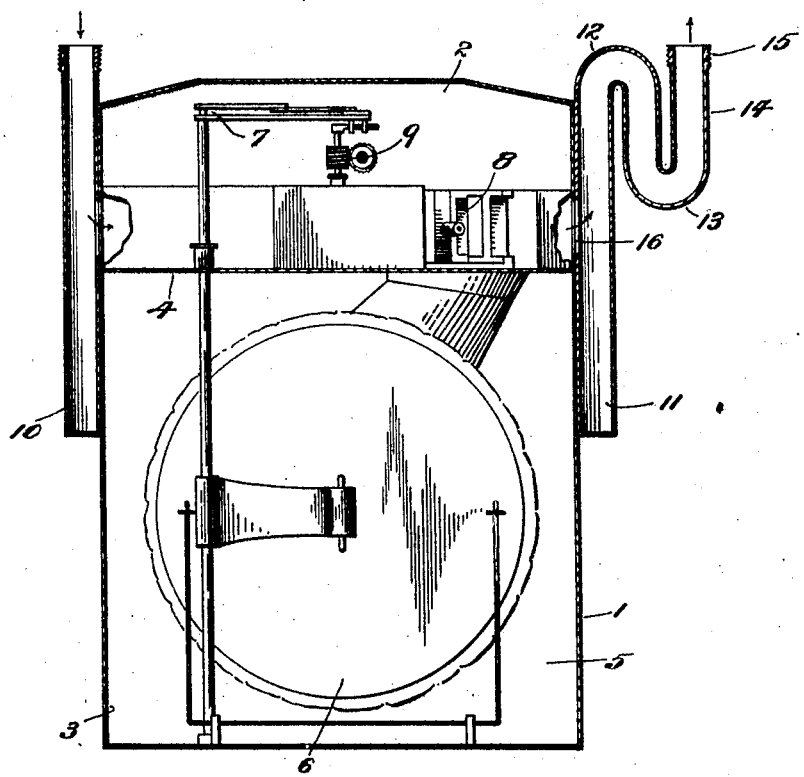
WITNESSES:
INVENTOR.
Frank Kennedy
BY
William D. Jackson
ATTORNEY.

UNITED STATES PATENT OFFICE.

FRANK KENNEDY, OF PHILADELPHIA, PENNSYLVANIA, ASSIGNOR OF ONE-THIRD TO ANNIE LAWLER, ONE-THIRD TO ANNE FLORENCE YERGER, AND ONE-THIRD TO JOHN McCLINTOCK, JR., ALL OF PHILADELPHIA, PENNSYLVANIA.

MEANS TO PREVENT MISUSE OF GAS-METERS.

932,140.  Specification of Letters Patent.  Patented Aug. 24, 1909.

Application filed July 17, 1908. Serial No. 443,964.

*To all whom it may concern:*

Be it known that I, FRANK KENNEDY, a citizen of the United States, residing at Philadelphia, in the county of Philadelphia and State of Pennsylvania, have invented certain new and useful Means to Prevent Misuse of Gas-Meters, of which the following is a specification.

It frequently happens that persons tamper with the operation of a gas meter by holding in check the movement of the valves within the meter so that the revolution of the test hands of the meter dial do not register the full volume of gas passing through the meter. The holding of these valves in check may be accomplished by unscrewing the outlet pipe of the meter and inserting some object therethrough and wedging or otherwise arresting the movement of the valves.

The principal object of the present invention is to overcome the above recited disadvantageous features and to provide means adjacent to the outlet pipe and valves to prevent the insertion of articles that might impede the travel of said valves.

The invention consists of the improvements hereinafter described and finally claimed.

The nature, characteristic features and scope of the invention will be more fully understood from the following description taken in connection with the accompanying drawings forming part hereof and in which there is shown a view partly in section illustrating a gas meter having attached thereto means embodying the invention.

In the drawings there is shown a gas meter 1, which may be of any preferred construction, and is divided into two main compartments 2, and 3, by a horizontal partition 4. The lower of these compartments is divided into two chambers by means of a vertical partition 5. The two lower chambers contain the bellows 6, the alternate opening and closing of which as gas is admitted first within the bellows and then within the space surrounding the bellows, furnishes motive power which by suitable mechanism 7, is made to operate valves 8, to control the flow of gas and also to work the gears 9, that are connected with the test hands upon the meter dials which record the amount of gas passing through the meter. In this connection gas is admitted by way of the inlet pipe 10, and passes from the meter through the outlet pipe 11.

The above described parts are all well known in the art and have been merely illustrated and described for a better understanding of the invention.

Referring now to my improvement, the outlet pipe 11, is shown as being provided with a double bend 12—13, terminating in a straight portion 14, provided with the usual screw-threaded portion 15. As clearly illustrated the end of the pipe 11, when constructed in this manner provides a sinuous passage therethrough, and while not interfering with the free passage of gas, prevents the insertion through said end of the pipe of any article that would tend to obstruct the valves 8, in their accustomed reciprocating movement.

By the above described arrangement of parts it is apparent that the operation of the valves and recording mechanism of a gas meter cannot be tampered with by the insertion through the exhaust pipe 11, of wires, hooks or other articles calculated to hold in check the valves of the meter.

What I claim is:

1. For guarding the registering devices of a gas-meter, the combination of a meter-case and an exit-pipe, one end of said pipe being secured to the meter-case and apertured for the passage of gas and the opposite end of said pipe being free of the meter-case and formed to provide a tortuous delivery passage.

2. For guarding the registering devices of a gas-meter, the combination of a meter-case and its complemental exit-pipe, one end of said pipe being secured to the meter-case and apertured for the passage of gas and the opposite end of said pipe being free of the meter-case and reversely curved to form a sinuous delivery passage therethrough.

In testimony whereof I have hereunto signed my name.

FRANK KENNEDY.

Witnesses:
SAML. W. SALUS,
M. E. EASTLACK.